INVENTOR.
ALBERT B. MOORE

June 20, 1967   A. B. MOORE   3,325,958
PREASSEMBLED STRUCTURAL FRAMEWORK
Filed Sept. 1, 1964   5 Sheets-Sheet 3

INVENTOR.
ALBERT B. MOORE
BY
Davis, Hoxie, Faithfull & Hapgood
ATTORNEYS.

INVENTOR.
ALBERT B. MOORE
BY
ATTORNEYS.

United States Patent Office 3,325,958
Patented June 20, 1967

3,325,958
PREASSEMBLED STRUCTURAL FRAMEWORK
Albert B. Moore, Falls Village, Canaan, Conn. 06018
Filed Sept. 1, 1964, Ser. No. 393,697
18 Claims. (Cl. 52—647)

The invention relates to a structural framework designed to be completely prefabricated and preassembled as a single unit in an unstressed and collapsed position, and to be operable between that position and a stressed functioning position of practically any designed shape. The invention also includes said framework being designed so that its shape may be changed while remaining essentially a single unit.

The variety of frameworks presently used in dome structures, quonset structures, industrial displays, and structures and buildings generally of many different shapes, are all generally constructed by initially fabricating the structural members at an industrial plant, shipping the members to the site where the structure is to be erected, and constructing the frameworks on a piece-by-piece basis at the site. Skilled labor, a large amount of time, and commensurate expense are required for this construction operation. The framework cannot be constructed as unitary preassembled structures on an assembly line basis at the industrial plant, since the resulting size of the frameworks would in many cases be larger than the industrial plant; additionally, it would obviously be unfeasible to transport any such large frameworks over any distance.

Many present-day structures are also only erected for specific purposes encompassing relatively short periods of time, i.e., military buildings (field headquarters, aircraft hangars, etc.), industrial displays at trade shows and fairs, and World's Fair pavilions. When the structures have outlived their usefulness, they are generally taken apart on a piece-by-piece basis which again requires skill, time and expense. These structures are not readily transportable as units to a new site, and a large number of the structural members in the frameworks may not be salvagable during disassembling for further use in other structures.

Presently used structural frameworks have the further disadvantage of being essentially limited to the shape they are assembled in. This problem becomes particularly pertinent when the initial shape of a structure becomes undesirable, either for aesthetic or functional reasons, and a new structure of a different shape is desired at the same location. New size and shape requirements may bar the mere addition of a further framework on to the old structure, and the old structure must be torn down before the new structure can be erected. Quonset hangars designed for propeller driven aircraft, for instance, may prove inadeqate in size for large jet propelled aircraft; or, the perimeter of the working area of an industrial factory may prove inadequate for a new and different industry considering acquiring the structure but having larger space requirements of a given perimeter shape; or, a homeowner may desire his home to take on a different shape and style of architecture.

It is the primary object of the present invention to provide a unitary structural framework which overcomes the above deficiencies and disadvantages of present day framework assembly and disassembly methods, as well as the limited shape versatility of frameworks once they are erected. The present invention includes a framework designed to be completely prefabricated and preassembled as a single unit in an unstressed and collapsed position. The framework may then be transferred to a desired site in such compact form and there be expanded into stressed functioning position of practically any designed shape by applying force at a few selected points on the framework. This process is reversible in that the expanded stressed framework is collapsible to its unstressed position, and thus easily transported to a new site. The framework may also be designed so that its shape may be changed while remaining essentially a single unit. These features are carried out in their broadest form by interconnecting the main tension and compression structural elements to form a grid which when expanded and stressed includes a plurality of plane figures having at least three sides. The sides of all of the plane figures in the grid are pivotal at their ends about their adjoining sides, and at least one side of a plurality of said figures is operable between an extended and a contracted position. The grid is preassembled as a single unit in a collapsed unstressed position with the expandable-contractable members in one position, either expanded or contracted, and the sides of the plane figures pivoted about and folded on one another. The framework grid is transported in this collapsed and folded position, and is quickly and easily raised at its selected site into an expanded stressed position by pivoting the sides of one or more plane figures so that one or more plane figures are fully defined. The remaining plane figures of the grid are progressively urged into open and full position, with the expandable-contractable members in the grid thereby operated to the position opposite that maintained when said grid is in its collapsed unstressed position. The plane figures included within the grid, as well as the shape of the expanded grid, may take a variety of configurations, as will be described in the following disclosure; and, the main structural members and their connections within the grid may be made adjustable in order to vary the shape that the expanded grid takes.

Other objects and the full nature of the invention will be readily understood and appreciated from the following detailed description, taken in conjunction with the acompanying drawings wherein several embodiments of the invention are illustrated by way of example.

Figure 1:
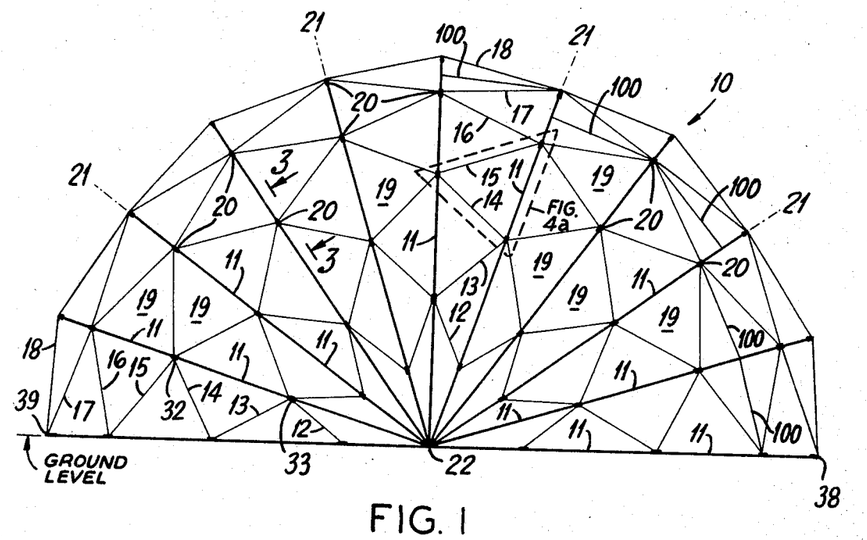
FIGURE 1 is a side elevational view of a stressed and expanded dome-like framework which may be constructed according to various embodiments of the present invention.
Figure 2:
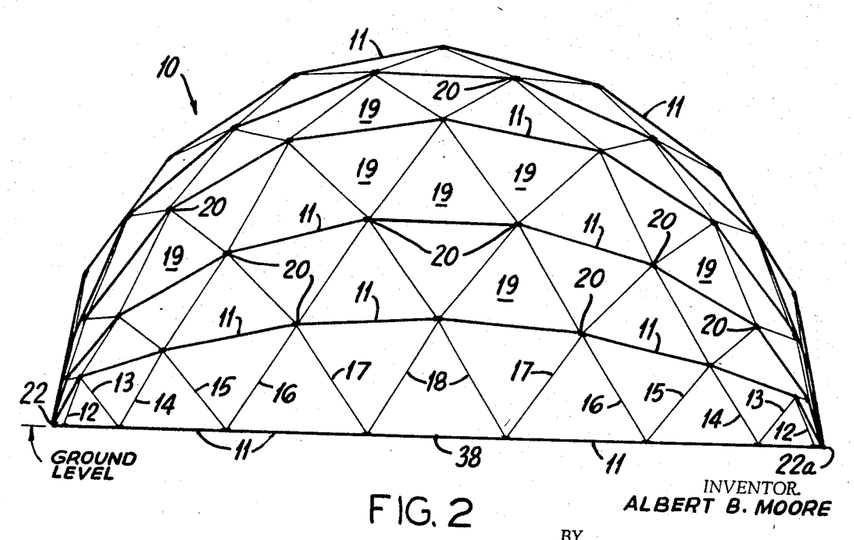
FIGURE 2 is a side elevational view of the framework of FIGURE 1 taken at a right angle from the FIGURE 1 view.

Referring to FIGURES 1 and 2, reference numeral 10 designates a stressed and expanded dome-like framework constructed according to one embodiment of the present invention having a plurality of compression members 11 and a plurality of tension members 12 through 18. These members are interconnected together to form a grid comprised of a plurality of three-sided plane figures generally designated 19. Compression members 11 are lengths of structural material designed to accept great amounts of compression for their weight without distortion, and tension members 12 through 18 are lengths of structural material designed to accept great amounts of tension for their weight without distortion. Modern structural materials such as plastic or light-weight alloys are advantageously used for members 11 and 12 through 18, allowing the grid 10 to have great rigidity and strength for its total weight and making the grid 10 easy to transport and manipulate. Members 11 and 12 through 18 are interconnected with each other by connectors 20 which are illustrated in detail in FIGURES 3, 4a and 4b, and are described below. Compression members 11 are rigidly attached to one another by the connectors 20 to form several distinct series 21 of compression members, each series 21 approximating a great circle segment of the dome. The several series 21 all converge and are attached to one another at the ground level of the dome at diametrically opposite points 22 and 22a. Since the several series 21 of the compression members 11, each defining a separate plane, converge in the dome-like framework, it will be appreciated that the tension members 12 through 18, being interconnected between the several series 21 of compression members 11, will necessarily vary in length. The lower-numbered tension members are therefore seen to be shorter than the higher-numbered tension members. Stressed and expanded framework 10, as comprised of the above components, readily absorbs large forces at any particular point on the grid and distributes these forces throughout the remainder of the framework.

Figure 3:
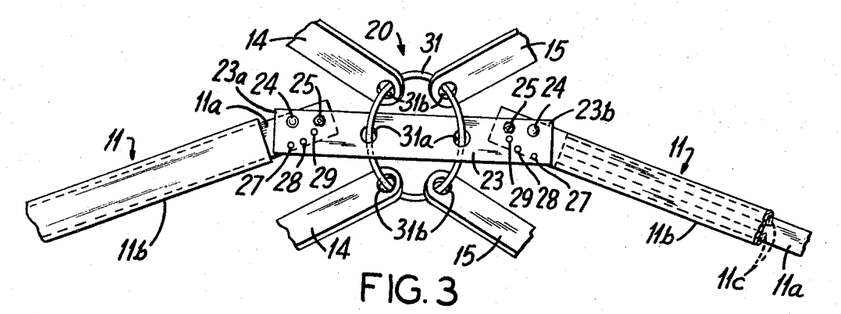
FIGURE 3 is a detailed view taken along lines 3—3 of FIGURE 1, and illustrates a typical means of connecting the main structural members of the grid according to one embodiment of the present invention.
Figure 4A:
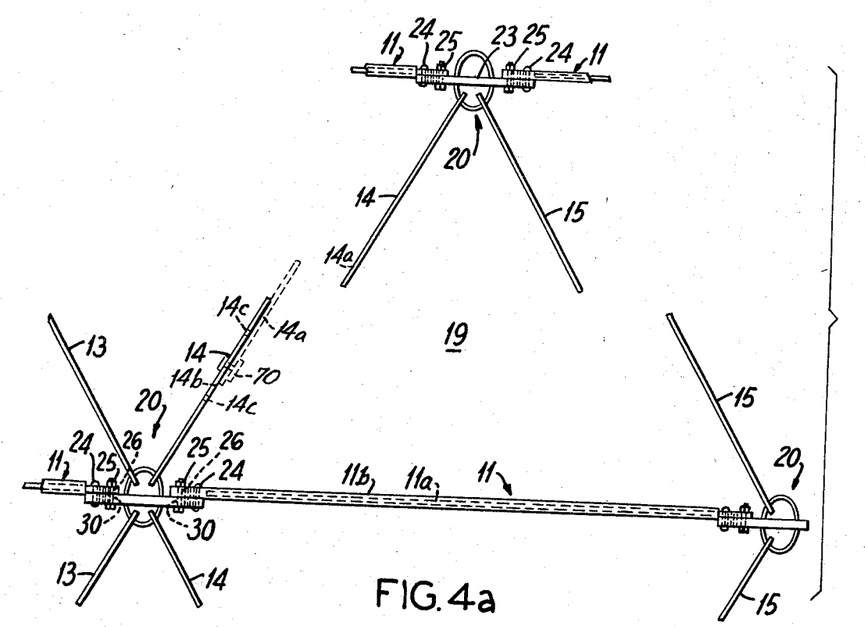
FIGURE 4a is a detailed fragmented view of the portion of FIGURE 1 enclosed within the dotted lines and illustrates a stressed and expanded basic plane figure within the framework including an expandable-contractable structural member constructed according to one embodiment of the present invention.
Figure 4B:
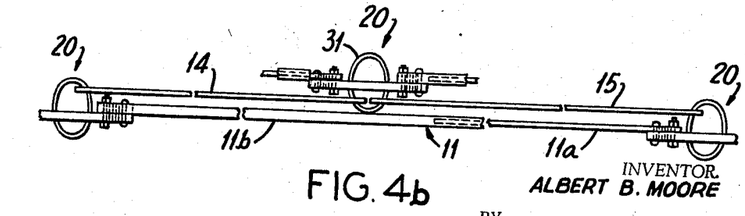
FIGURE 4b is a detailed fragmented view of the plane figure of FIGURE 4a in its collapsed and unstressed position.

FIGURES 3, 4a and 4b illustrate a typical connector 20 constructed according to one embodiment of the present invention, including hinge member 23 which is designed to rigidly attach adjacent compression members 11 in each series 21 to each other in one of a plurality of fixed positions. Hinge member 23 has end portions 23a and 23b, each end overlapping and being pivotally attached to the end of a compression member 11 by a pivot 24. The rigid attachment of adjacent compression members 11 at a given angle with one another is then established by detachable bolts 25 which are inserted through holes 26 in the ends of the adjacent compression members and one of a series of holes 27, 28, 29 and 30 in each hinge end portion 23a and 23b. It will be appreciated that adjacent compression members 11 may take a plurality of rigid positions with each other at different angles, since, when each bolt 25 is removed from hole 26 and whichever hole 27, 28, 29 or 30 it is in, each member 11 may be pivoted about hinge member 23. Hole 26 in an end of each member 11 may be aligned with any one of holes 27, 28, 29 or 30 in an end of hinge member 23, as member 11 is pivoted about hinge member 23, and bolt 25 may then be inserted in the new hole alignment. The angle that adjacent compression members assume with each other in the several series 21 is of course dependent on the shape of the framework desired. In structures having less of a curvilinear shape than in FIGURE 1, adjacent compression members 11 in a series 21 will assume less of an angle with each other than that shown in FIGURE 3.

Each hinge member 23 also includes a ring member 31, with said ring member loosely passing through holes 31a in hinge 23 and also loosely passing through a hole 31b in the end of each tension member terminating at the connector. The ring members 31 in the connectors 20 are therefore pivoting means connecting the tension member sides of plane figures 19 at their ends about their adjoining tension and compression members which form other sides of plane figures 19, with all of the tension members 12 through 18 in the framework thereby being able to freely pivot about their adjacent compression and tension members in the framework grid (when considered in conjunction with the expandable-contractable means to be described below in reference to FIGURES 4a and 4b). For the purpose of defining each plane figure 19, each connector 20 may be though of an essentially a single at which tension and compression members, as sides of plane figures 19, come together. Connector 20, as described above in terms of its components, is intended only by way of example, and it will be appreciated that other connector constructions may be employed to achieve the same result.

A basic feature of the present invention is to provide a structural framework that may be completely pre-assembled as a single unit in an unstressed and collapsed position. FIGURE 4a shows a typical stressed and expanded three-sided plane figure 19 of FIGURE 1 in fragmented detail, including tension members 14 and 15 connectors 20, and compression member 11. Each compression member 11 in the grid is expandable-contractable as shown in FIGURES 3, 4a and 4b, being comprised of portions 11a and 11b, and attaches to connectors 20 at its opposite ends by means of portion 11a at one end and portion 11b at the opposite end. Portion 11a is slidable within channels 11c formed by the overlapping sides of portion 11b, and each compression member 11 is therefore operable between an expanded and a telescoped position. Compression member 11 in its expanded position is equal in length to approximately the combined end to end length of tension members 14 and 15, and has very little of portion 11a telescoped within portion 11b. In the contracted position of member 11, however, practically all of portion 11a is telescoped within portion 11b. Ring members 31 permit tension members 14 and 15 to pivot about each other and about compression member 11, so that plane figure 19 may operate between a collapsed position shown in fragmented detail in FIGURE 4b wherein tension members 14 and 15 lay flat on compression member 11 and said member 11 is in its expanded or opened position, and an open stressed position shown in FIGURE 4a wherein compression member 11 is in its contracted or closed position and tension members 14 and 15 are pivoted to define the opened position of plane figure 19.

Figure 5:
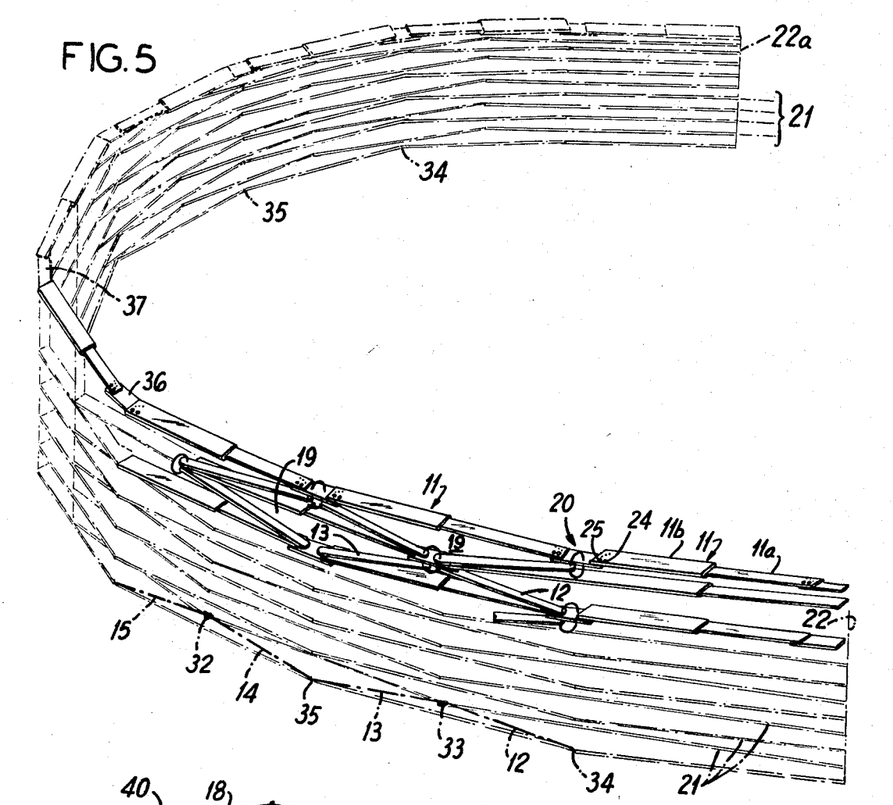
FIGURE 5 is a perspective partial view of the framework of FIGURE 1 in its preassembled collapsed and unstressed position, with only a few plane figures shown by way of example in detail according to one embodiment of the present invention.

It may be seen from FIGURES 1 and 2 that the tension and compression members forming the sides of each plane figure 19 in the grid in turn from the sides of adjacent plane figures 19, and each plane figure 19 is constructed and operable in the above described manner of FIGURES 4a and 4b between an open stressed position and a collapsed unstressed position. When the plane figures 19 are all in their collapsed position, therefore, the several series 21 of compression members have folded toward one another by pivoting about points 22 and 22a to become parallel to each other and separated only by a very small distance. This collapsed unstressed position of framework 10, which is folded to approximately the size of the structural members comprising it, is shown in FIGURE 5. Only a few plane figures 19 are shown in detail in FIG- URE 5, said figures being not quite fully collapsed to show the manner in which they fold, but it will be recognized that all other plane figures in the grid are collapsed in like fashion. The several series 21 of compression members 11 are shown in phantom, and, being comprised of compression members 11 in their expanded position, said series define longer arcs than they do in FIGURES 1 and 2 where they are comprised of compression members 11 in the contracted position. The framework grid as described above may be fabricated and preassembled at a factory in the collapsed form shown in FIGURE 5, and as such requires only a relatively small manufacturing area. The framework may be transported in its collapsed position to a suitable site, and then raised to its stressed position of FIGURES 1 and 2 with ease in a small amount of time. The raising procedure of the FIGURE 1 dome is accomplished by inserting hydraulic jacks or other suitable means at one or more selected points 32, 33, etc., where tension members converge. An upward force exerted solely at point 32, for example, will urge the collapsed plane figure 19 including tension members 14 and 15 into its expanded position, and the expansion of said plane figure will in turn progressively urge the rest of the plane figures 19 in the framework 10 into expanded and rigid position. In other words, the framework 10 readily unfolds from its position of FIGURE 5 to its position of FIGURE 1. The framework is of course attached to the ground at points 34, 35, etc. before this raising procedure is carried out. When the framework is fully expanded, it is then attached to the ground at several points along the ground level periphery of the structure to hold it in position. In the fully stressed and expanded position of FIGURE 1, all of the members 11 are in their contracted position and are acting as stressed compression members, and all of the members 12 through 18 are acting as stressed tension members. The structure in such position has great strength and rigidity for its weight, with the tension and compression forces of the structure uniformly distributed throughout.

The configuration and features of the present invention shown in FIGURES 1 through 5 can also be achieved by making one or both of the tension members in each plane figure 19 as the expandable-contractable member(s), rather than the compression member. Where one or more of the tension members of each plane figure 19 are expandable-contractable, they will be comprised of two portions slidable with each other to operate between an expanded and a telescoped position, as described above in relation to the expandable-contractable compression member. In such an arrangement, referring to FIG. 4b, tension members 14 and 15 must have a combined length in the collapsed position of plane figure 19 substantially equal to the fixed length of compression member 11. In such a collapsed configuration of each plane figure 19, each expandable-contractable tension member will be in its contracted position. When each plane figure 19 is operated to its expanded and stressed position, however, each expandable-contractable tension member will be in its expanded position. It will in fact be recognized that one, two or even all three sides of each plane figure 19 of framework 10 may be expandable-contractable in the manner of compression member 11 as previously described and shown in FIGURES 4a and 4b, as long as the three sides are compatible to permit each plane figure 19 to operate between a stressed expanded and an unstressed collapsed position. The sides of each collapsible plane figure 19, being common to adjacent plane figures 19, then permit the framework grid as a unit to be expandable-collapsible. When one or both of the tension members in each plane figure 19 are the expandable-contractable members, however, the urging of one or more plane figures 19 into expanded positions will not automatically urge the rest of the plane figures 19 in the collapsed framework of FIGURE 5 into expanded position. The raising procedure will then be carried out by attaching a crane or other suitable means to one or more points 36, 37, etc. of FIGURE 5 and pulling and unfolding the framework into its expanded and stressed position of FIGURE 1.

Figure 6:
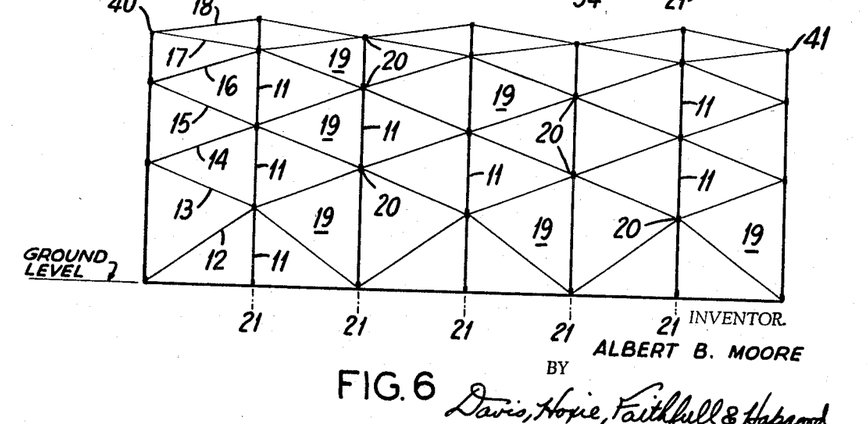
FIGURE 6 is a side elevational view of a stressed and expanded quonset-like framework which may be constructed according to various embodiments of the present invention.

The expanded shape of the structural framework grid disclosed by the present invention is by no means limited to the dome-like shape shown in FIGURES 1 and 2. For example, one half of the structure of FIGURE 1 can be formed as described above, having a shape approximating a quarter-sphere for use as a concert shell or outdoor theatre. Such a structure will collapse due to the force of gravity back to the FIGURE 5 position, unless it is held up by exterior forces or, preferably, by interior forces such as provided by rigid compression members 100 bisecting a few plane figures 19 of the grid and locking the quarter-sphere in its expanded position. As another shape example, FIGURE 6 illustrates the side elevational view of a quonset-shaped framework which is constructed in exactly the same manner as disclosed above in relation to FIGURES 1 through 5. The only differences between the FIGURE 1 and FIGURE 6 structures is that in FIGURE 6 the several series 21 of compression members 11 do not converge but rather are parallel, and tension members 12 through 18 are therefore all equal in length. Connectors 20 are constructed as shown in FIGURES 3, 4a and 4b, and the quonset structure and the plane figures 19 comprising it are likewise operable between an unstressed collapsed and a stressed expanded position. The compression and/or one or more of the tension members of each plane figure 19 are expandable-contractable, and the structure may therefore be preassembled as a single unit with the several series 21 folded practically on top of one another, transported in collapsed form and quickly raised into expanded position. The raising procedure may be carried out from the position similar to FIGURE 5, commencing with the collapsed structure laying flat on its side. The framework is then urged or pulled into its fully expanded position, with the expanded quonset then standing on one end and ready to have its other end lowered by a crane or other suitable means to position the quonset on the ground as shown in FIGURE 6. The expanded quonset stood on its end will collapse back to the position similar to FIGURE 5 due to the force of gravity unless it is held up, but if another identical expanded quonset is also stood on its end and the corresponding several series 21 of the two quonsets at the same levels are rigidly connected together at their ends to form closed figures, a cylindrical structure is formed which stands upright without being held up and which can not collapse from the force of gravity. Such a cylindrical framework, when appropriately covered, may be used as a water tower or a silo. This result is due to the fact that the compression members 11 in each series 21 of each one of the quonsets are in their contracted position and are prevented from expanding by the corresponding rigidly connected series 21 of the other quonset completing the cylindrical framework.

Figure 8:
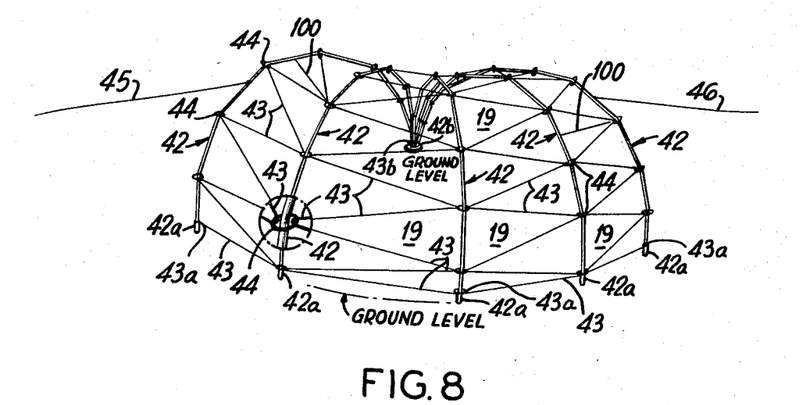
FIGURE 8 is a perspective view of a stressed and expanded, arbitrarily shaped framework which may be constructed according to various embodiments of the present invention.

The present invention is not limited to any of the structures described above, but in fact may be utilized for structures or sections of structures of practically any shape including straight and/or curvilinear portions. Once the desired shape of the structure is arrived at, the lengths of the compression members, the angles that the compression members take with each other in the several series of the compression members and the lengths of the tension members, are all determined to conform the shape of the expanded framework to the shape of the desired structure. These various parts are designed to be compatible with each other so that the plane figures defined by the framework and the framework itself will be operable between a collapsed position and an expanded stressed position as described above, and the framework is then constructed as a single unit in collapsed position. FIGURE 8, for example, is a completely arbitrary expanded shape of an expandable and collapsible structure that may be constructed according to the present invention as described above.

The above-described structures may be moved to another location when desired merely by collapsing them to an easily transportable position such as shown in FIGURE 5. This procedure is conveniently carried out for the FIGURE 1 structure by means of a crane attached to the ground level periphery such as at points 38 or 39 midway between the two points 22 and 22a where the several series 21 converge, said crane then lifting at points 38 or 39 and folding the dome-like framework back upon itself whereby each plane figure 19 and the dome as a unit are progressively collapsed. In the FIGURE 6 structure, the procedure is carried out by attaching a crane to points 40 or 41 at an end of the quonset structure, slightly lifting that end of the structure off the ground, and pulling that end of the structure towards its other end to collapse each plane figure 19 and the entire structure. In any given structure of any designed shape constructed according to the present invention, the method of collapsing the structure will be easily determined.

The structure of FIGURE 8, whose shape is shown only by way of example, may be constructed exactly as described above in relation to FIGURES 1–6, or may be constructed according to another embodiment of the present invention which also provides the expandable-contractable features allowing the framework to be preassembled in collapsed position as a single unit. In this embodiment, each compression member 42 may be a single rigid unitary member throughout. One end 42b of each compression member 42 is seen to converge at a common point, with the opposite ends 42a of the compression members being spaced from one another. Attached at intervals along each compression member 42 are ring members 44, one of which is shown in detail. A different continuous flexible tension member 43, which may be a high tension strength cable, alternately passes back and forth between each pair of adjacent compression members by slidably extending through said ring members. A grid of three-sided plane figures is thereby defined by the tension and compression members. Each flexible tension member 43 is anchored at its ends 43a and 43b at opposite ends 42a and 42b of compression members 42, and the compression members 42 are in turn firmly anchored at their ends to the ground. The FIGURE 8 structure may additionally be anchored by cables 45 and 46 to the ground to assure its rigidity, or by locking compression members 100. This structure, as so formed, has great strength for its weight, with the tension and compression forces of the structure uniformly distributed throughout.

That the embodiment of FIGURE 8, shown in stressed and expanded position, may be preassembled as a single unit in collapsed position, will be understood by realizing that if the ends 42a and 42b of compression members 42 are not anchored to the ground, the compression members 42 can be made to fold toward each other by detaching all the tension member ends 43a and 43b from the ends of the compression members and pulling the two ends of each tension member in opposite directions. Flexible tension members 43 will pivot about and slide in relation to the various ring members 44, each plane figure in the grid will collapse, and the framework of FIGURE 8 will take the collapsed position shown in FIGURE 9. In this embodiment, then, the two sides of each plane figure 19 formed by a portion of a tension member 43 may also be thought of as being extendable and contractable, and pivotal about each other and the compression member side of FIGURE 19. Alternately, only one end 43a or 43b of each tension member 43 need be detached from the end of a compression member, and a pulling stress on the detached ends of the tension members will likewise draw the spaced ends 42a of compression members 42 toward each other.

Figure 9:
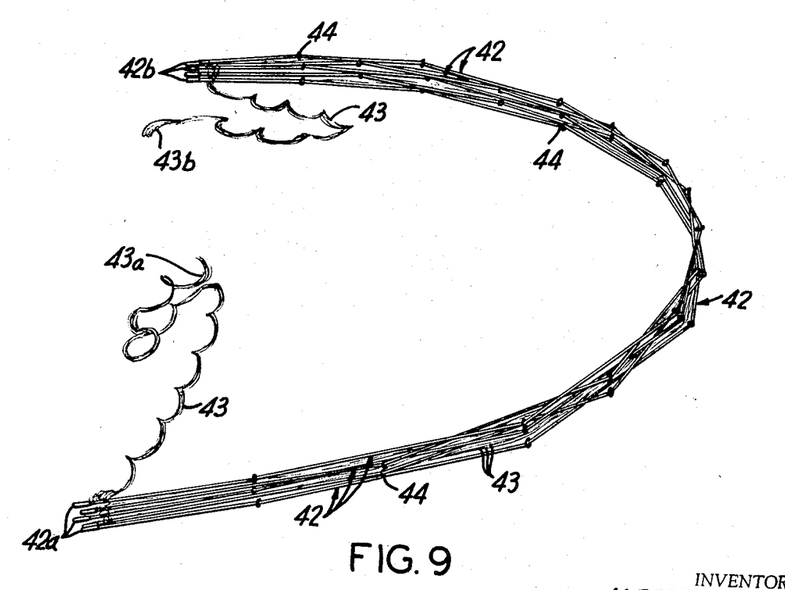
FIGURE 9 is a perspective view of the framework of FIGURE 8 according to one embodiment of the present invention, it its preassembled collapsed and unstressed position.

A structure designed according to this embodiment is initially preassembled in collapsed position as in FIGURE 9, with the tension members 43 extending through the appropriate ring members 44 and their ends 43a and 43b loosely extending past the compression member ends 42a and 42b. The lengths of the various tension members 43 are designed such that they will be full stressed when the compression members are positioned in their designed positions for the erected structure. The collapsed structure is then transported to its desired site, the ends 43a and 43b of the tension members are attached to the ends of the compression members, and the compression members are pulled apart by a crane or other suitable means, in the process of which the tension members 43 slide through ring members 44 and become somewhat stressed. The ends 42a and 42b of the compression members are then placed in their designed positions and anchored to the ground, which completes the stressing of tension members 43 so that they are taut.

A still further modification of the embodiment of the present invention described in relation to FIGURE 8 may be constructed by fixedly attaching the flexible tension members 43 to each ring member 44, rather than said tension members being slidable with said ring members. In such an embodiment, the tension member sides of figures 19 are formed of sections of tension members 43 and are fixed in length. In the grid of FIGURE 8 constructed according to this embodiment, the grid is collapsed by pulling the compression member ends 42a toward one another, whereby the flexible tension members 43 pivot about ring members 44 to fold randomly between the compression members. The grid is expanded by pulling the compression member ends 42a away from each other, whereby the flexible tension members pivot about ring member 44 and unfold to the stressed and taut position to define the fully opened plane figures 19. The tension member sides of the plane figures 19 are still extendable—contactable in that the sides, when taut, are in their extended functioning position, and when randomly folded and unstressed, are in a contracted and non-functioning position.

Preassembled structures formed as a single unit according to the two embodiments described above having flexible tension members may assume practically any stressed and expanded shape depending on the shape of the compression members 42 and their positioning relationship to each other. The structures of FIGURES 1 and 6, for example may easily be formed according to these embodiments. The shape of structures formed according to these embodiments may also be varied, while remaining essentially a single unit, by changing the positioning of the compression members 42 with each other and the length of the tension members 43 forming tension member sides of the plane figures 19 where necessary. These lengths may be changed by either cutting the flexible members to shorten them, or splicing on additional material to lengthen them. Additionally, compression members 42 may each be comprised of a number of separate compression segments rigidly connected in series, and the angle each segment takes with its adjacent segments may be adjustable as described above in relation to FIGURES 3, 4a and 4b. The shape of each compression member 42 is therefore a further variable.

The shape of structures formed according to the embodiment of the present invention described above in reference to FIGURES 1–6, wherein all the tension and compression members of the grid are rigid, may also be varied while the structure remains essentially a single unit. The angles that compression members 11 take with one another in the several series 21 are variable, as described above, so that each of the several series 21 may be made to assume different configurations. These configurations may be linear, curvilinear, sharply angled or any combination of these. Additionally, the compression members 11 and tension members 12 through 18 may be made adjustable in length. Each tension and/or compression member of the grid that is not expandable-contractable may be formed of two segments that overlap at the middle of the member and are detachably bolted together, whereby the length of the member may be adjusted by unbolting the two segments, varying the amount of overlap, and reattaching the two segments at a new position. As shown for example in FIGURE 4a, in dotted line form, tension member 14 may be comprised of two segments 14a and 14b, which overlap and are bolted together by bolt 70. Bolt holes 14c in segment 14b allow the amount of overlap of segments 14a and 14b to be varied, by detaching bolt 70 and rebolting the two segments together through the same bolt hole in member 14a and a new bolt hole 14c in member 14b. Each tension and/or compression member of the grid that is expandable-contractable is already comprised of two segments slidably engaged with each other as described above, and one of these two segments may in turn be formed of two overlapping segments that are detachably bolted together, whereby the member may also be adjusted in length in addition to being expandable-contractable. When the lengths of the tension members in the grid are adjusted, the positioning that the several series 21 of compression members take with each other is changed, and the lengths of the compression members must also be adjusted so that the sides of each plane figure in the grid remain compatible to allow each plane figure and the grid as a unit to still operate between an expanded and contracted position. A grid may therefore be varied in shape by initially collapsing it as described in reference to FIGURES 1–6, changing the configuration of the several series 21 of compression members 11 by adjusting the angles within said series, and/or adjusting the lengths of the tension and compression members forming the plane figures. The new grid structure which the old grid structure is to be converted to may be initially designed by a model or by a computer, so that the exact lengths and angles within the new structure are known. After these angles and lengths are changed according to the new design, the new structure is then raised into its stressed and expanded position. The FIGURE 1 shape, for example, is easily changed to the FIGURE 6 shape by collapsing it and changing the lengths of the tension and compression members whereby each plane figure 19 in the grid becomes an isosceles or equilateral triangle and all tension members in the grid are equal in length. As another example, if it is desirable to retain the shape of the FIGURE 6 grid but make its size considerably larger, the structure may be collapsed and the angles within the several series 21 may be changed so that each compression member 11 is in more of a linear relationship with its adjoining members. The arc described by each series 21 then assumes a flatter configuration than before, and the corresponding angles in each series are changed in the same manner such that each series 21 as modified is of the same configuration as the other serveral series 21. A further preassembled and collapsed grid is then attached on to the modified grid of FIGURE 6, of a shape such that the total combined grid in expanded and stressed form defines a quonset structure of the desired size larger than the original quonset structure. The structure of FIGURE 6, with its angles modified as described, then forms only a portion of the new and larger quonset structure. A structure formed according to the present invention therefore has considerable shape versatility, by virtue of the structural members and angles within the grid being adjustable, and such a structure may be varied to form all or a subassembly portion of new structures of various configurations.

Figure 7A:
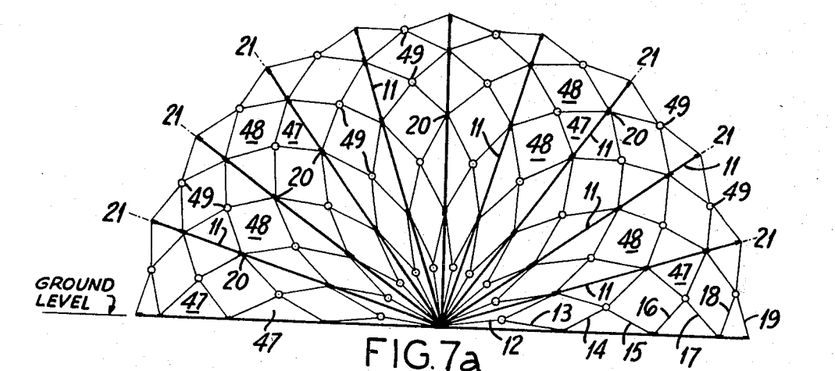
FIGURES 7a, 7b, and 7c are side elevational views of stressed and expanded dome-like frameworks of further framework configurations, which may be constructed according to various embodiments of the present invention.
Figure 7B:
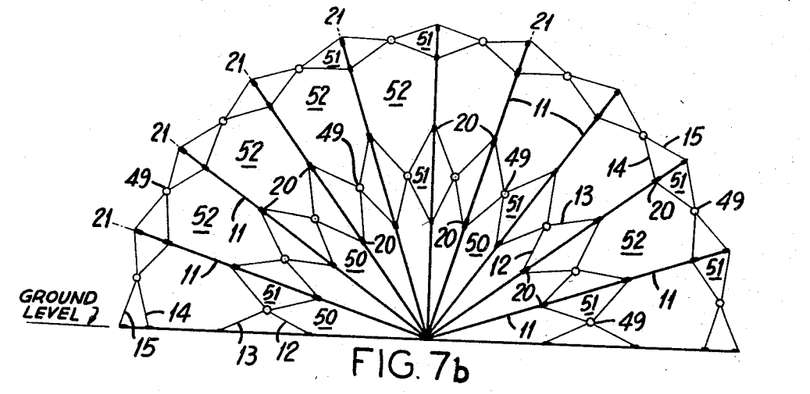
Figure 7C:
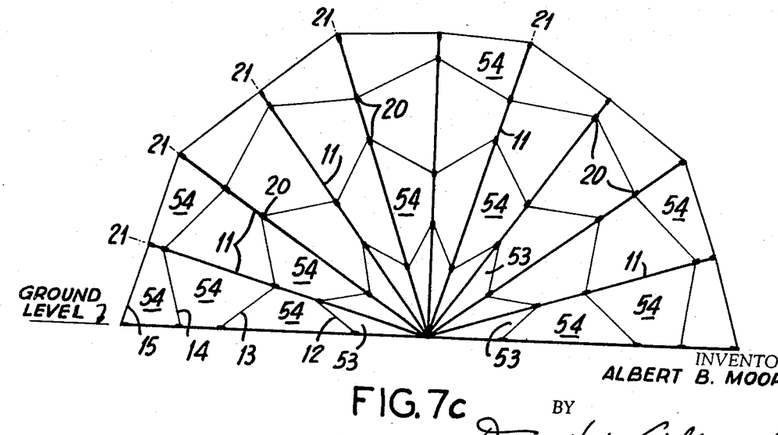

The shape of structures formed in FIGURES 1–6, 8 and 9 have been described above in terms of grids comprised of triangular plane figures, but the present invention also includes preassembled grids in which the main structural elements are interconnected to form many different geometric configurations. FIGURES 7a, 7b, and 7c illustrate further particular configurations by way of example.

FIGURE 7a, including compression members 11 forming the several series 21, tension members 12 through 19 interconnected between the several series, and connectors 20, all as described above in reference to FIGURES 1–6, illustrates a side elevational view of a dome-shaped grid comprised of alternating three-sided plane figures 47 and four-sided plane figures 48 along each series 21. If only the compression members 11 are the expandable-contractable members in the grid, then only the plane figures 47 have a side which operates between extended and contracted positions, in the manner described relating to FIGURES 1–6. All of the plane figures 47 and 48 and the grid as a unit are still expandable and collapsible, however, since ring members 49 (identical to ring members 44) which loosely join the tension members to each other at the points in between the several series 21 allow the joint adjacent tension members to freely pivot about one another. When the compression members are operated to their expanded unstressed position, all the tension members 12 through 19 will pivot and lay flat on compression members 11, all the plane figures in the grid thereby collapse, and the grid assumes a position similar to that of FIGURE 5. If at least one tension member in each three-sided plane figure 47 is extendable-contractable, on the other hand, then all of the plane figures 47 and 48 in the grid have a side which operates between an extended and contracted position. One, two or three sides of each triangle 47 may be extendable-contractable, as described above, and the grid may still be made expandable-contractable. FIGURE 7a is in a fact a grid somewhat similar to the grid of FIGURE 1, with every other series 21 of compression members 11 removed.

FIGURE 7b, constructed by compression members 11 forming the several series 21 tension members 12 through 15, connectors 20, and ring members 49, illustrates a side elevational view of a dome-shaped grid comprised of four-sided plane figures 50, three-sided plane figures 51 and six-sided plane figures 52, along each series 21. Only the compression members 11 forming sides of three-sided plane figures 51 need to be extendable-contractable to allow the plane figures 50, 51, and 52 and the grid as a unit to be expandable-contractable between a collapsed position similar to that of FIGURE 5 and the stressed position of FIGURE 7b. In this arrangement, none of the sides of the six-sided plane figures 52 or the four-sided plane figures 50 need be extendable-contractable.

FIGURE 7c illustrates a side elevational view of a dome-shaped grid comprised of three-sided plane figures 53 and four-sided plane figures 54, the grid again being formed of compression members 11 forming the several series 21, tension members 12 through 15 interconnected between the several series 21, and connectors 20. Various combinations of one, two, three or four sides of plane figures 54, and one, two or three sides of plane figures 53 may be made extendable-contractable to allow all of the plane figures 53 and 54 and the grid as a unit to be expandable-contractable between a collapsed position similar to that of FIGURE 5 and the stressed position of FIGURE 7c.

FIGURES 7a, 7b and 7c are all structural grid configurations which may be preassembled in collapsed unstressed position in the manner of FIGURE 5, and easily raised by crane or other suitable means at a building site into an expanded and fully stressed position. In the collapsed position of the grids, the several series 21 are separated from one another by little more than the widths of tension members. The structural members and angles within the grids may also be made adjustable as described in relation to FIGURES 1–6, to allow the shape of the grids to be varied.

FIGURES 1–9 are shown only by way of example, and many different geometric grid configurations may be used to achieve the features of the present invention. And, the different grid configurations may be constructed according to any of the different embodiments and features of the invention described above. Furthermore, grids of many different shapes may be formed by any of the embodiments of the present invention, and grids of various shapes may be joined to other grids to form structures of still further shapes (such as two quarter-sphere grids joined respectively to the opposite ends of a semi-cylinder grid to form a quonset structure with enclosed ends).

Structural frameworks constructed according to the present invention may be enclosed in a variety of ways, such as by plastic foam, vinyl, canvas, or interlocking lightweight plastic or metal panels. The type of enclosure arrangement and material will depend on the use and permanency of the structure, and should be such as to facilitate removal when the time comes for the structure to be collapsed.

It will be understood by those skilled in the art that the present invention may assume varied physical forms with varied details of construction, arrangement of parts and the like without departing from the inventive concept.

I claim:

1. An expandable-contractable structural framework, operable from an unstressed collapsed position to a stressed expanded position, comprising in combination a plurality of load distributing members acting as compression members when the framework is operated to a stressed expanded position, first means linking said members to one another to form distinct series of compression members, a plurality of load distributing members acting as tension members when the framework is operated to a stressed expanded position, second means interconnecting said tension members between adjacent series of compression members, said second means permitting the tension members to pivot at their ends about their adjoining tension and compression members, and third means providing for a plurality of said compression members to operate between an unstressed extended position and a stressed contracted position, the series of compression members being operated toward each other when said extendable-contractable compression members are operated to an unstressed extended position, and the series of compression members being operated away from each other when said extendable-contractable compression members are operated to a stressed contracted position.

2. An expandable-contractable structural framework, operable from an unstressed collapsed position to a stressed expanded position, comprising in combination a plurality of load distributing members acting as compression members when the framework is operated to a stressed expanded position, first means rigidly linking said members to one another to form distinct series of compression members, a plurality of load distributing members acting as tension members when the framework is operated to a stressed expanded position, second means interconnecting said tension members between adjacent series of compression members to form a grid which when expanded includes a plurality of plane figures, at least one side of each plane figure being a tension member and a plurality of said plane figures having tension members for at least two of their sides, said second means permitting the tension members to pivot at their ends about their adjoining tension and compression members, and third means providing for a plurality of said tension members to telescope between an unstressed contracted position and a stressed extended position, said extendable-contractable tension members being telescoped to an unstressed contracted position when the series of compression members are operated toward each other, and said extendable-contractable tension members being extended to a stressed expanded position when the series of compression members are operated away from each other.

3. An expandable-contractable structural dome, operable from an unstressed collapsed position to a stressed expanded position, comprising in combination a plurality of compression members approximating great circle segments of said dome, a plurality of tension members, first means interconnecting said tension members between adjacent great circle segments to form a grid which when expanded includes a plurality of triangles, two sides of each triangle being formed of tension members and the third side of a compression member, said first means permitting the tension member sides of said triangles to pivot at their ends about their adjoining sides, and second means providing for at least one member of each triangle to operate between an extended and a contracted position, said great circle segments operating toward each other when said extendable-contractable members are operated in one direction and said great circle segments operating away from each other when said extendable-contractable members are operated in the opposite direction.

4. An expandable-contractable semi-cylindrical structure, operable from an unstressed collapsed position to a stressed expanded position, comprising in combination a plurality of compression members approximating parallel semicircles, a plurality of tension members, first means interconnecting said tension members between adjacent semicircles to form a grid which when expanded includes a plurality of triangles, two sides of each triangle being formed of tension members and the third side of a compression member, said first means permitting the tension member sides of said triangle to pivot at their ends about their adjoining sides, and second means providing for at least one member of each triangle to operate between an extended and a contracted position, said parallel semicircles operating toward each other when said extendable-contractable members are operated in one direction and said parallel semicircles operating away from each other when said extendable-contractable members are operated in the opposite direction.

5. An expandable-contractable structural framework, operable from an unstressed collapsed position to a stressed expanded position, comprising in combination a plurality of first load distributing members; a plurality of second load distributing members; first means interconnecting said plurality of first and second members to form the framework, said plurality of first and second members forming sides of and defining a plurality of plane figures when the framework is expanded to a stressed position; said first members acting as compression members when the framework is operated to a stressed expanded position; said second members acting as tension members when the framework is operated to a stressed expanded position; each plane figure having at least three sides and at least one side of each plane figure being a tension member; a plurality of said plane figures having tension members for at least two of their sides; said first means fixedly linking the ends of all the sides of each plane figure to the ends of their adjoining sides; and permitting the tension member sides of all the plane figures in the framework to pivot at their ends about their adjoining sides; second means providing for at least one side of a plurality of said plane figures to operate between an extended and a contracted position; and, said first and second means cooperating to permit each plane figure, and the entire framework as a unit, to operate from a collapsed unstressed position to an expanded stressed position.

6. The invention defined in claim 5, wherein said tension and compression members are rigid members and said extendable-contractable sides of a plurality of said plane figures are each comprised of two parts telescopically operable with relation to each other.

7. The invention defined in claim 5, wherein said first means includes linkages rigidly connecting said compression members to one another to form distinct series of compression members.

8. The invention defined in claim 7, wherein said linkages have adjustable means permitting each compression member to take a plurality of fixed positions with its adjoining compression members in each said series.

9. The invention defined in claim 5, wherein said tension members and compression members are adjustable in length.

10. The invention defined in claim 7, wherein said linkages have adjustable means permitting each compression member to take a plurality of fixed positions with its adjoining compression members in each said series, and said tension members and compression members are adjustable in length.

11. The invention defined in claim 5, including locking means to lock the framework in its open stressed position.

12. The invention defined in claim 5, wherein said compression members are rigid members and said tension members are flexible members.

13. The invention defined in claim 5, wherein said framework when expanded to a stressed position includes a plurality of triangular configurations, two sides of each triangle being tension members and the third side being a compression member, and at least one side of each triangle being operable between an extended position and a contracted position.

14. An expandable-contractable structural framework, operable from an unstressed collapsed position to a stressed expanded position, comprising in combination a plurality of first load distributing members; a plurality of second load distributing members; first means interconnecting said plurality of first and second members to form the framework, said plurality of first and second members forming sides of and defining a plurality of plane figures when the framework is expanded to a stressed position; said first members acting as compression members when the framework is operated to a stressed expanded position; said second members acting as tension members when the framework is operated to a stressed expanded position; each plane figure having at least three sides and at least one side of each plane figure being a tension member; a plurality of said plane figures having tension members for at least two of their sides; and, said second members being sufficiently flexible so as to be foldable to an unstressed collapsed position when the compression members are operated toward each other, said flexible tension members being operated to a stressed and taut position when the compression members are operated away from each other.

15. The invention as defined in claim 14, wherein said flexible tension members are fixedly attached to said first means.

16. The invention as defined in claim 14, wherein said flexible tension members are slidable through said first means.

17. The invention defined in claim 14, wherein said first means includes linkages rigidly connecting said compression members to one another to form distinct series of compression members.

18. The invention defined in claim 17, wherein said linkages have adjustable means permitting each compression member to take a plurality of fixed positions with its adjoining compression members in each said series.

References Cited
UNITED STATES PATENTS

| | | | |
|---|---|---|---|
| 2,914,074 | 11/1959 | Fuller | 52—81 X |
| 3,000,386 | 9/1961 | Schulze et al. | 135—4 |
| 3,064,667 | 11/1962 | Marino | 135—7.1 |
| 3,082,780 | 3/1963 | Macy | 135—4 |
| 3,149,703 | 9/1964 | De Felice | 52—64 X |

DAVID J. WILLIAMOWSKY, *Primary Examiner.*

HARRISON R. MOSELEY, K. DOWNEY, *Examiners.*

L. J. SANTISI, *Assistant Examiner.*